US010036325B2

(12) United States Patent
Frey (10) Patent No.: US 10,036,325 B2
(45) Date of Patent: Jul. 31, 2018

(54) VARIABLE FLOW COMPRESSOR OF A GAS TURBINE (71) Applicant: General Electric Company, Schenectady, NY (US)

(72) Inventor: George Frederick Frey, Houston, TX (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 15/086,051

(22) Filed: Mar. 30, 2016

(65) Prior Publication Data
US 2017/0284300 A1 Oct. 5, 2017

(51) Int. Cl.
F02C 7/22 (2006.01)
F02C 9/16 (2006.01)
F02C 9/26 (2006.01)
F02C 3/04 (2006.01)
F02C 7/232 (2006.01)
F02C 9/28 (2006.01)
F02C 9/30 (2006.01)
F02C 9/36 (2006.01)
F04C 18/16 (2006.01)

(52) U.S. Cl.
CPC ............... F02C 7/22 (2013.01); F02C 3/04 (2013.01); F02C 7/232 (2013.01); F02C 9/28 (2013.01); F02C 9/30 (2013.01); F02C 9/36 (2013.01); F04C 18/16 (2013.01); F05D 2260/85 (2013.01); F05D 2260/98 (2013.01); F05D 2270/3015 (2013.01); F05D 2270/331 (2013.01)

(58) Field of Classification Search
CPC .. F04D 29/057; F04D 29/5806; F04D 17/122; F04D 25/06; F02C 6/18; F02C 7/22; F02C 7/25; F02C 3/30; F02C 7/32; F02C 7/20; F02C 7/28; F02C 7/16; F02C 9/28; F02C 7/224; F02C 9/16; F02C 9/26
USPC ................................... 137/14, 12, 3
See application file for complete search history.

(56) References Cited

U.S. PATENT DOCUMENTS 4,314,441 A * 2/1982 Yannone ............ F02C 9/28
   60/39.281
4,470,118 A * 9/1984 Morrison ........... F02C 9/28
   60/39.281
4,506,503 A * 3/1985 Ogborne ............ F02C 9/28
   60/39.281

(Continued)

FOREIGN PATENT DOCUMENTS

EP    0 679 800 A2    11/1995

OTHER PUBLICATIONS

Extended European Search Report and Opinion issued in connection with corresponding EP Application No. 17162480.2 dated Aug. 28, 2017.

(Continued)

Primary Examiner — Jelani A Smith
Assistant Examiner — Luis A Martinez Borrero
(74) Attorney, Agent, or Firm — Fletcher Yoder, P.C.

(57) ABSTRACT

A system and medium for controlling a fuel gas compressor of a gas turbine system that compresses a gaseous fuel for consumption in a high-pressure combustor. Moreover, the compressor is configured to generate a discharge pressure for the combustor based at least in part on a load demand for the gas turbine system.

20 Claims, 4 Drawing Sheets

(56) References Cited

U.S. PATENT DOCUMENTS

| | | | | |
|---|---|---|---|---|
| 4,752,193 | A * | 6/1988 | Horler | F01D 25/183 184/6.11 |
| 4,922,710 | A | 5/1990 | Rowen et al. | |
| 5,033,944 | A * | 7/1991 | Lassota | F04B 27/02 418/1 |
| 5,609,016 | A * | 3/1997 | Yamada | F02C 3/22 60/39.281 |
| 6,612,820 | B1 * | 9/2003 | Staat | F04C 27/009 418/1 |
| 6,651,433 | B1 * | 11/2003 | George, Jr. | B63G 8/12 60/614 |
| 6,874,324 | B2 * | 4/2005 | Sekihara | F01D 5/025 60/798 |
| 8,181,624 | B2 * | 5/2012 | Van Blaricom | F01C 1/123 123/237 |
| 8,713,946 | B2 * | 5/2014 | Botarelli | F02C 9/00 60/39.23 |
| 8,875,530 | B2 | 11/2014 | Foye et al. | |
| 8,882,476 | B2 | 11/2014 | Kameya et al. | |
| 8,899,942 | B2 | 12/2014 | Kopko et al. | |
| 8,899,950 | B2 | 12/2014 | Kapadia et al. | |
| 8,904,813 | B2 | 12/2014 | Lifson et al. | |
| 8,920,149 | B2 | 12/2014 | Hossain et al. | |
| 9,043,118 | B2 * | 5/2015 | Healy | F01D 17/00 123/321 |
| 9,752,458 | B2 * | 9/2017 | Huntington | F01D 25/30 |
| 9,863,267 | B2 * | 1/2018 | O'Dea | F01D 21/003 |
| 9,869,247 | B2 * | 1/2018 | Vorel | F02C 3/34 |
| 2003/0007873 | A1 | 1/2003 | Hattori et al. | |
| 2003/0205213 | A1 * | 11/2003 | Aquino | F01C 1/22 123/241 |
| 2004/0112679 | A1 * | 6/2004 | Centers | F04C 18/16 184/7.4 |
| 2004/0206064 | A1 * | 10/2004 | Reiter | F01D 5/187 60/39.45 |
| 2005/0160736 | A1 * | 7/2005 | Reale | A63B 71/0605 60/772 |
| 2007/0144193 | A1 * | 6/2007 | Crane | F25B 49/022 62/228.4 |
| 2010/0212311 | A1 * | 8/2010 | McQuary | F25B 9/14 60/520 |
| 2010/0229566 | A1 * | 9/2010 | Takahashi | F01D 5/18 60/772 |
| 2012/0051958 | A1 * | 3/2012 | Santos | F01C 21/0836 418/1 |
| 2012/0174592 | A1 * | 7/2012 | Liedtke | F02C 9/263 60/773 |
| 2012/0247115 | A1 * | 10/2012 | Sasahara | F02C 6/18 60/772 |
| 2013/0058799 | A1 * | 3/2013 | Scarpinato | F04B 49/06 417/53 |
| 2013/0209299 | A1 * | 8/2013 | Santos | F04C 18/356 418/1 |
| 2015/0135722 | A1 * | 5/2015 | Takahashi | F02C 3/107 60/774 |
| 2015/0176593 | A1 * | 6/2015 | Dayalan | F16C 17/10 415/1 |
| 2015/0185716 | A1 * | 7/2015 | Wichmann | F01K 23/101 700/287 |
| 2015/0226133 | A1 * | 8/2015 | Minto | F02C 3/34 60/39.27 |
| 2016/0341131 | A1 * | 11/2016 | Nakagawa | F02C 9/46 |
| 2017/0044997 | A1 * | 2/2017 | Nakagawa | F02C 7/22 |
| 2017/0336930 | A1 * | 11/2017 | Tappan | G06F 3/0482 |

OTHER PUBLICATIONS http://kobelcocompressors.com/index.php/oil-injected_screw_gas_compressors/.

Wennemar, Dry Screw Compression Performance and Application Range, Proceedings of the Thirty-Eighth Turbomachinery Symposium, 2009. http://turbolab.tamu.edu/proc/turboproc/T38/ch14_Wennemar.pdf.

Pillis, Basics of Operation and Application of Oil Flooded Rotary Screw Compressors, Proceedings of the 28th Turbomachinery Symposium, 1999, http://turbolab.tamu.edu/proc/turboproc/T28/Vol28015.pdf.

Pillis, Basics of Operation, Application and Troubleshooting of Screw Compressors, Frick, 1998 http://www.petroassist.com/Tech%20Know/ScrewCompressors.pdf.

* cited by examiner

VARIABLE FLOW COMPRESSOR OF A GAS TURBINE

BACKGROUND

The subject matter disclosed herein relates to turbomachinery, such as gas turbine engines with one or more compressible fuel fluid flows. More particularly, the present disclosure relates to fuel gas compressor operation supplying the gas turbine engine.

A gas turbine compresses ambient air in its compressor, mixes the compressed air with a combustible fuel and expands the ignited mixture in the turbine to generate mechanical power. A gas turbine power plant uses fuel to be pressurized so it can be mixed in the high-pressure compressor discharge. Screw compressors may be used to push gaseous fuel into a single or multiple of gas turbines. As the gas turbine increases in load, its pressure ratio increases and it also consumes more fuel flow. However, a fuel gas compressor feeding the turbine typically operates with a constant discharge pressure.

BRIEF DESCRIPTION

Certain embodiments commensurate in scope with the present disclosure are summarized below. These embodiments are not intended to limit the scope of the disclosure, but rather these embodiments are intended only to provide a brief summary of possible forms of the disclosure. Indeed, the invention may encompass a variety of forms that may be similar to or different from the embodiments set forth below.

In a first embodiment, a gas turbine system includes a combustor configured to burn a fuel and air mixture. The gas turbine system also includes a fuel gas compressor configured to compress fuel for the fuel and air mixture. The compressor is configured to generate a discharge pressure for the combustor based at least in part on a load demand for the gas turbine system.

In a second embodiment, a gas turbine system includes a combustor configured to burn a fuel and air mixture and a fuel gas compressor configured to compress fuel for the fuel and air mixture. The gas turbine system also includes a controller that includes a processor configured to control the compressor and memory storing instructions. The instructions are configured to cause the processor to vary a discharge pressure from the fuel gas compressor based at least in part on load demand for the gas turbine system and limit the discharge pressure to a value above a minimum threshold.

In a third embodiment, non-transitory, computer-readable medium storing instructions which when executed are configured to cause a processor to receive an indication of a load demand for a gas turbine system, set a discharge pressure of a compressor of the gas turbine system based at least in part on the indication, and limit the discharge pressure to a value above a pressure differential across the fuel gas compressor that is sufficient to flow lubricant through the compressor.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

Present embodiments are directed to a gas turbine system including a fuel gas compressor. As noted above, as a load demand increases for a gas turbine, the fuel flow used to operate the gas turbine to meet the load demand increases. In other words, fuel flow is primarily driven by load demand. Other factors such as ambient temperature, fuel composition, and other factors may also influence the requirement. Furthermore, as discussed below, the fuel gas compressor pushes more fuel through the system at higher load demands to meet the load demands. In other words, a variable flow and/or pressure compressor may be used to vary a provided pressure and/or flow to match load demand without producing additional pressure and/or flow that is not used by the combustor.

If the flow and/or pressure of a compressor of the gas turbine are maintained at a constant level, the flow and/or pressure level have to be sufficient for relatively high load demands. However, the amount of flow and/or pressure is at least partially unused for consumption in a combustor of the gas turbine. Instead, excess pressure is reduced through fuel metering valves (e.g.,). An alternative is to lower flow and/or pressure generated by the compressor. For example, displacement of the compressor may be reduced at relatively low demand loads. For instance, if the compressor is a screw compressor, a slide valve may be used to change a spacing between the screws to reduce displacement of the compressor. Although the pressure and/or flow may be reduced for the compressor, if a pressure differential across the compressor does not surpass a lubricant threshold, lubricant may not be flowed sufficiently through the compressor to lube flow to screw, bearings, seals, and slide valve actuator of the compressor at each load. Thus, the variable discharge pressure may include a minimum differential pressure or flow setting required to establish safe operation.

Figure 1:
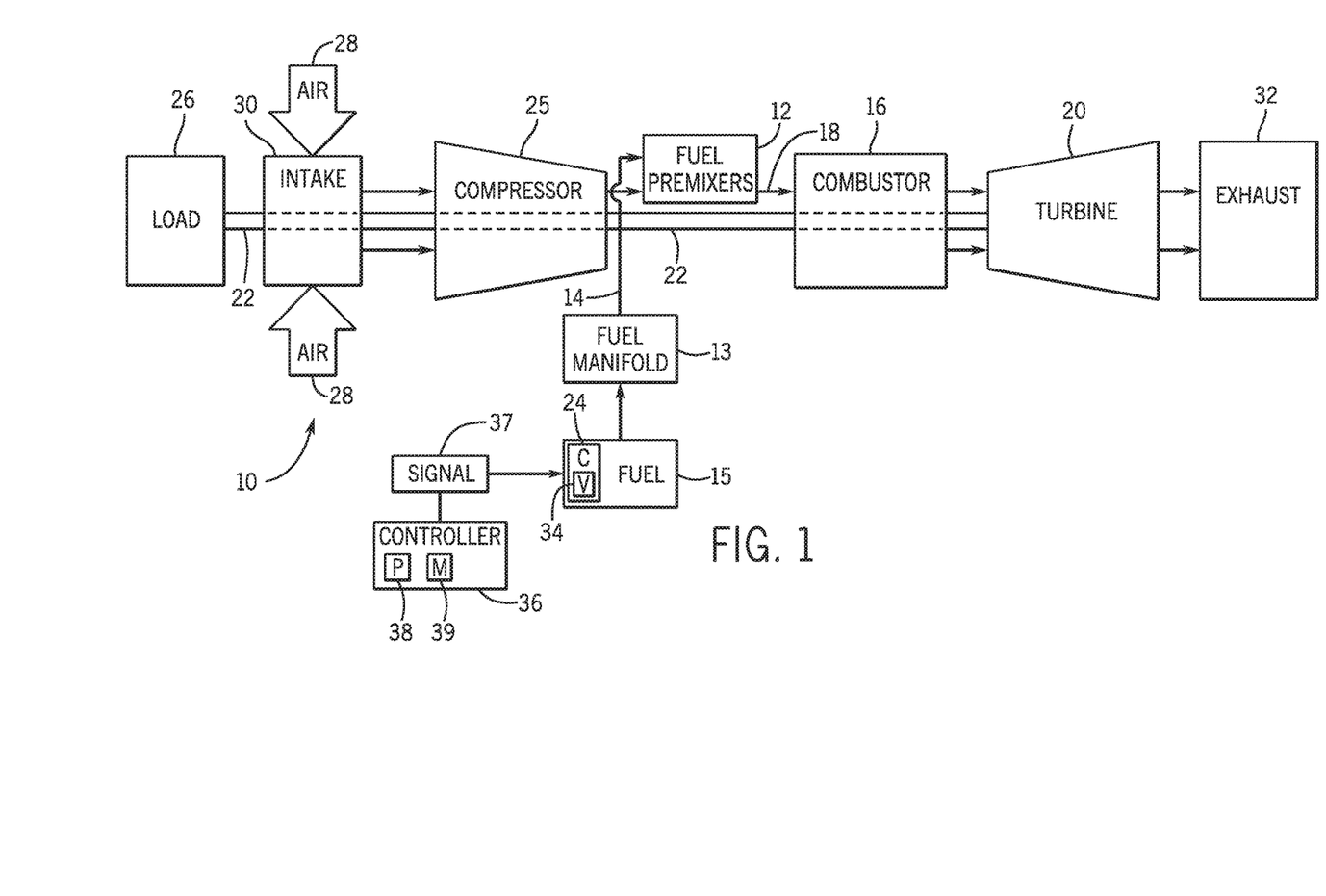
FIG. 1 is a schematic view illustrating a gas turbine in accordance with present embodiments.

Turning now to the drawings and referring first to FIG. 1, a block diagram of an embodiment of a gas turbine 10 (e.g., a gas turbine engine) is illustrated. It should be noted that the present disclosure may relate to any turbomachine system, and that the gas turbine 10 discussed herein does not limit the scope by which the present disclosure applies. A turbomachine system may relate to any system that involves the transfer of energy between a rotor and a fluid, or vice versa, and the illustrated gas turbine 10 is only meant to serve as a representation of an embodiment of a turbomachine system.

The illustrated gas turbine 10 includes, among other features, a fuel premixer 12, a fuel manifold 13, fuel passageway 14, a fuel supply 15, and a combustor 16. Although the illustrated embodiment of the gas turbine 10 includes only a single fuel supply 15, embodiments of the gas turbine 10 may be a dual fuel gas turbine 10, where multiple fuel manifolds 13 from multiple fuel supplies 15, via multiple fuel passageways 14, various types of fuel to one or more fuel premixers 12. For simplicity, only one fuel manifold 13 and fuel supply 15 (and associated fuel passageways 14) is shown, but it should be understood that the illustrated gas turbine 10 may include multiple manifolds 13, each being configured to deliver a different type of fuel through respective fuel passageways 14 to the premixer(s) 12. For example, one type of fuel may be used for ignition (e.g., during a startup mode) and another type of fuel may be used for steady state operation of the gas turbine 10. In some embodiments, a single manifold 13 and/or a single premixer 12 may be employed with a single combustor 16. The fuel supply 15 also includes a fuel gas compressor 24 that may be used to compress fuel for consumption in the gas turbine 10.

As depicted, the fuel premixer 12 routes the fuel as an air-fuel mixture 18 into the combustor 16. For example, the fuel premixer 12 may initially route a mixture 18 of pilot fuel and air into the combustors 16 to start the combustion process (e.g., for an ignition process and/or startup mode), in accordance with the description above. The fuel premixer 12 may then route a mixture 18 of burn fuel and compressed air into the combustor 16 to continue the combustion process (e.g., for a burn process).

In some embodiments, as described above, the fuel premixer 12 mix the fuel (e.g., received from the fuel passageways 14 extending between the fuel manifold 13 and the premixers 12) with compressed air to form an air-fuel mixture 18 for delivery to the combustors 16. The air-fuel mixture 18 may include pilot fuel or burn fuel, depending on the stage of combustion (e.g., ignition process or steady-state burn process). The combustors 16 may then combust the mixture 18 to generate combustion products, which are passed to a turbine 20. The combustion products expand through blades or stages of the turbine 20, causing the blades of the turbine 20 to rotate. A coupling between the blades of the turbine 20 and a shaft 22 of the gas turbine 10 will cause the shaft 22 to rotate with the blades. The shaft 22 is also coupled to several other components throughout the gas turbine 10, as illustrated, such that rotation of the shaft 22 causes rotation of the components coupled to the shaft 22. For example, the illustrated shaft 22 is drivingly coupled to an air compressor 25 (which may supply the air for the air-fuel mixture 18). Although a single air compressor 25 may be illustrated, the air compressor 25 may be a compressor system that includes 2 or more compressors. Some of the compressors 25 may be used to compress air at a relatively low pressure while other compressors 25 may be used to compress air at relatively high pressure to provide additional pressure that may be used for other purposes (e.g., intercooling).

The shaft 22 is also coupled to a load 26. As appreciated, the load 26 may be any suitable device that may generate power via the rotational output of the gas turbine 10, such as an electrical generator of a power generation plant or a vehicle.

As noted above, an air supply 28 may provide air to an air intake 30, which then routes the air into the air compressor 25. Indeed, in some embodiments, the air supply 28 may be ambient air surrounding the gas turbine 10. Additionally or alternatively, the air supply 28 may include an oxidant, such as oxygen. The air compressor 25 includes a plurality of screw shafts drivingly coupled to the shaft 22. When the shaft 22 rotates as a result of the expansion of the exhaust gases (e.g., combustion products) within the turbine 20, the shaft 22 causes the screw shafts of the air compressor 25 to rotate, which compresses the air supplied to the air compressor 25 by the air intake 30 to generate compressed air. The compressed air is routed to the fuel premixers 12 for mixing with the fuel to generate the air-fuel mixture 18, which is then routed to the combustors 16. For example, the fuel premixers 12 may mix the compressed air from the air compressor 25 and the fuel from one of the fuel manifolds 13 to produce the air/fuel mixture 18, as previously described. After passing through the turbine 20, the exhaust gases exit the system at an exhaust outlet 32.

The fuel gas compressor 24 also includes one or more valves 34 that may be controlled by a controller 36. The valves 34 control capacity of the fuel gas compressor 24. Specifically, the valves 34 may include a recycle valve and a slide valve. The recycle valve returns compressor discharge flow back to a suction port of the fuel gas compressor 24. The recycle valve may also include cooling on compressed air returned to a suction port of the fuel gas compressor 24. The recycle valve can modulate from fully open to fully closed, giving a full range of control over the discharge flow and can help with loading/unloading of the fuel gas compressor 24. The slide valve controls displacement volume of the fuel gas compressor 24. A minimum pressure drop across the fuel gas compressor 24 is used to ensure lube oil flow to screw, bearings, seals, and slide valve actuator of the fuel gas compressor 24 at each load. A stable pressure differential is employed to adjust the slide valve position. Moreover, the recycle valve has a target position setpoint (e.g., 5%) to accommodate pressure fluctuations. However, in some embodiments, the recycle valve is to be closed to transfer all compressed fuel to the combustor 24 rather than lose some compressed air to recycling rather than to increased efficiency from the gas turbine 10 to siphon off pressure for circulating lubrication.

The fuel gas compressor 24 understandably has limits on operation that may be based on pressure ratios, pressure differentials, lubricant temperature and flow, and mechanical factors, such as stresses, strains, forces, and/or torques. These limits may be calculated during operation or predefined based on operation setpoints. In some embodiments, the limit may also define a max allowable slide valve position indicating a limit on a maximum displacement of the compressor.

In some embodiments, the controller 36 sends a control signal 37 that controls the valves 34. The setpoint for the control signal 37 may be derived from an indication that is received at the controller 36 that indicates an amount of pressure to be used by the gas turbine 10 during operation. In some embodiments, the indication signal may be received he directly from the gas turbine 10 (e.g., a fuel stroke reference), a distribute control system (e.g., header pressure), the compressor skid (e.g., recycle valve position), other suitable parameters, or a combination thereof.

Moreover, the controller 36 may include a processor 38 that is configured to execute instructions that are stored in a memory 39. The processor 38 may include a microprocessor or microcontroller, such as a reduced instruction set computer (RISC) or other suitable processors. The memory 39 includes non-transitory, computer-readable medium configured to store the instructions. The memory 39 may include volatile memory such as randomly accessible memory (RAM) and/or non-voltage memory such as hard disc memory, flash memory, and/or other suitable memory formats.

Figure 2:
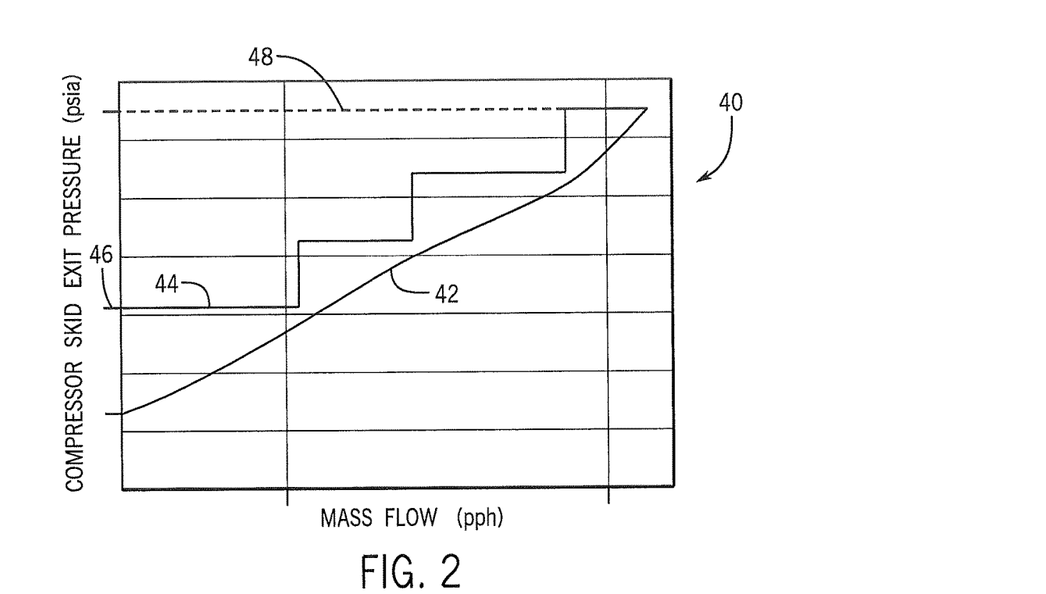
FIG. 2 illustrates an embodiment of a graph illustrating discharge pressure relative to gas turbine demand for the gas turbine of FIG. 1.

FIG. 2 illustrates a graph 40 illustrating a compressor pressure generation setpoints relative to pressure requirements by the gas turbine 10 due to fuel flow requirements corresponding to a load demand. The graph 40 includes a first line 42 that pressure to be used in the gas turbine 10 (e.g., the fuel gas compressor 24) to meet the load demand. The graph 40 also includes a second line 44 that corresponds to set points for pressure generation of the fuel gas compressor 24. As illustrated, the set points may include steps of pressure generation for the fuel gas compressor 24 based on fuel flow requirements of the gas turbine 10. Additionally or alternatively, the fuel gas compressor 24 discharge pressure may vary in a continuous function as long as the pressure remains above some minimum discharge pressure 46 and above the line 42 corresponding to gas turbine 10 requirements (as long as the fuel gas compressor 24 is not at maximum output discharge). The minimum discharge pressure 46 ensures that the fuel gas compressor 24 has enough pressure drop across the fuel gas compressor 24 is used to ensure lubricant flow to screw, bearings, seals, and slide valve actuator of the fuel gas compressor 24 at each load.

In other words, the discharge pressure of the fuel gas compressor 24 may be adjusted to lower levels for lower fuel flow requirements instead of a constant pressure 48 that is able to provide a pressure required by the gas turbine 10. In other words, by varying the pressure generated corresponding to fuel flow requirements, the fuel gas compressor 24 will modulate its discharge pressure to satisfy gas turbine 10 requirements while also adhering to its own physical limitations by adjusting capacity of the fuel gas compressor 24 without recycling additional flow to match compressor output to gas turbine 10 demand. Furthermore, the pressure to be generated by the fuel gas compressor 24 according to the setpoints may be achieved with reduced auxiliary loading (especially at turn down and startup) or additional parasitics (e.g., oil pumps) that constantly run. Since fuel gas compressor 24 output is controlled by plant changes, the fuel gas compressor 24 can automatically adjust and ensure there is a capacity for quick pressure ramps to meet grid dispatch requests.

As discussed previously, variable pressure and/or flow of the fuel gas compressor 24 enables more efficient use of the fuel gas compressor 24. In other words, varying the fuel gas compressor 24 discharge enables efficient operation of a gas turbine 10 without producing more pressure and/or flow than is to be used by the gas turbine 10 that is bled off using a recycle valve rather than passing to the combustor 16. Furthermore, by setting a minimum pressure and/or flow to the variable setpoints, a sufficient pressure to generate enough discharge pressure to meet a minimum pressure drop across the fuel gas compressor 24 is to ensure lubricant can flow to screw, bearings, seals, and slide valve actuator of the fuel gas compressor 24 at each load.

Figure 3:
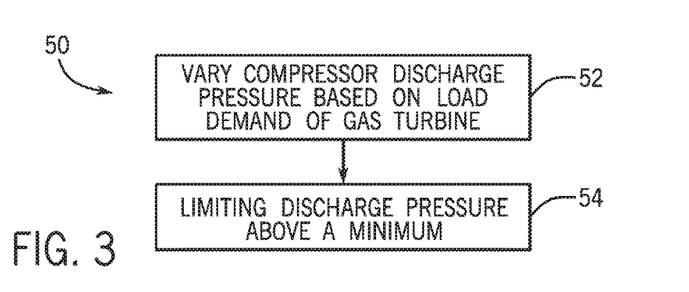
FIG. 3 is a flow-diagram view of a process for operating the gas turbine of FIG. 1 in accordance with present embodiments.

FIG. 3 illustrates a process 50 for operating a gas turbine. As noted previously, the gas turbine 10 includes a fuel gas compressor 24 that is controlled by a controller 36 that varies compressor discharge pressure based on load demand of the gas turbine 10 (block 52). By varying the discharge pressure, the fuel gas compressor 24 enables for efficient use of generated pressure and reducing the use of a recycle valve that bleeds of flow from going to the combustor 16. During operation, the controller 36 limits the discharge pressure to a minimum value to ensure sufficient pressure to provide lubricant flow to parts of the fuel gas compressor 24 and/or other parts of the gas turbine 10. For example, the controller 36 may limit fuel-flow increase (via the slide valve) unless the minimum value of pressure is currently available.

Figure 4:
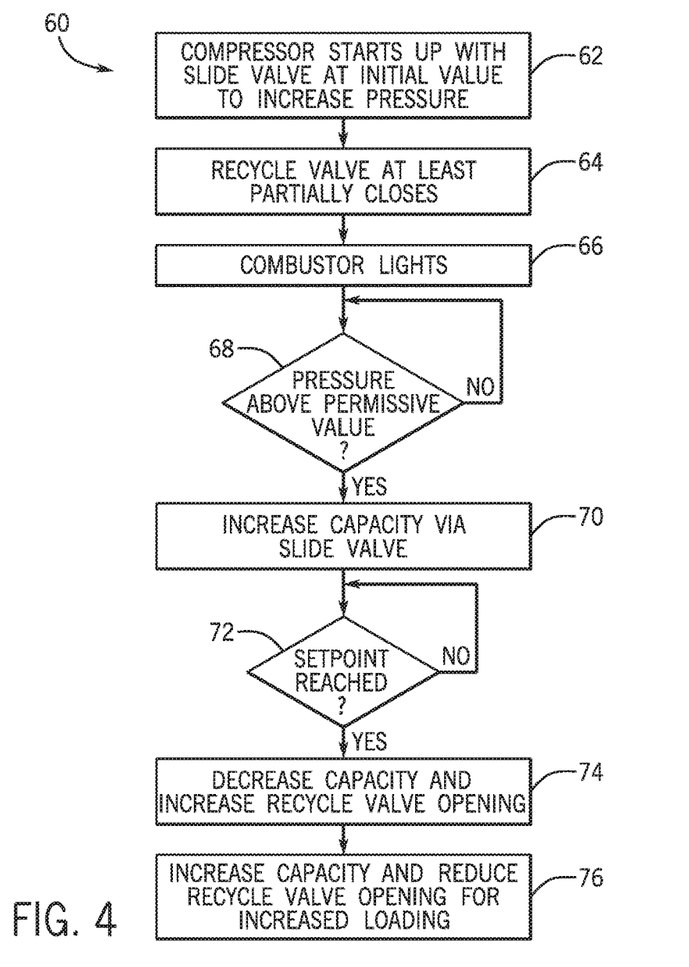
FIG. 4 is a flow-diagram view of a process for starting up the gas turbine of FIG. 1 in accordance with present embodiments.

More specifically, FIG. 4 illustrates a process 60 for starting up a gas turbine system 10. The compressor starts up and begins increasing pressure with a slide valve at an initial value (block 62). For example, the slide valve may be at a minimum opening that provides a minimum displacement in the fuel gas compressor 24 to maximum pressure build in the compressor. To increase pressure quickly, the controller 36 causes the recycle valve to at least partially close (block 64). For example, the recycle valve may close completely to insure that all flow increases discharge pressure during the build phase. At some point after the fuel gas compressor 24 has started up, the combustor 16 lights (block 66). For instance, the combustor 16 may light 1-2 minutes after the fuel gas compressor 24 has begun. Additionally or alternatively, timing of the lighting of the combustor 16 may be based at least in part on the pressure discharged from the fuel gas compressor 24. Lighting of the combustor 16 decreases a rate of pressure buildup in the fuel gas compressor 24, but the pressure continues to build. The controller 36 determines whether the pressure in the fuel gas compressor 24 has exceeded a permissive pressure value (block 68). The permissive pressure value (e.g., 520 psig) may correspond to the minimum pressure value to ensure lubricant flow in the gas turbine 10, such as the fuel gas compressor 24. If the pressure has not reached the permissive pressure value, the pressure continues to build. Once the pressure has reached the permissive pressure value, the controller 36 opens the slide valve to increase displacement of compressor. In some embodiments, the slide valve may be restricted to movement until after a final pressure is reached with an exception for startup processes.

The controller 36 tracks the pressure of the outlet pressure until the pressure reaches a setpoint. In other words, the controller 36 determines whether the setpoint has been reached (block 72). For example, the setpoint may be determined from the graph 40 and load demand for the gas turbine 10. If the setpoint has been reached, the controller 36 may decrease capacity of the fuel gas compressor 24 via the slide valve and/or increase recycle valve opening to regulate the pressure (block 74). As the gas turbine 10 demand increases or even during steady-state operation, the capacity may be increased and/or recycle valve may be closed (block 76). As such, the fuel gas compressor 24 capacity is decreased to reduce recycle flow and match fuel gas compressor 24 output to gas turbine 10 demand. Moreover, the recycle valve may be used to quickly change pressure output while the slide valve may be used to make more slow adjustments that increases efficiency of fuel flow. In other words, ideally the recycle valve remains as closed as possible (e.g., completely closed, 5% open) during operation and the slide valve may be adjusted to reduce an amount of flow that is to be recycled.

Figure 5:
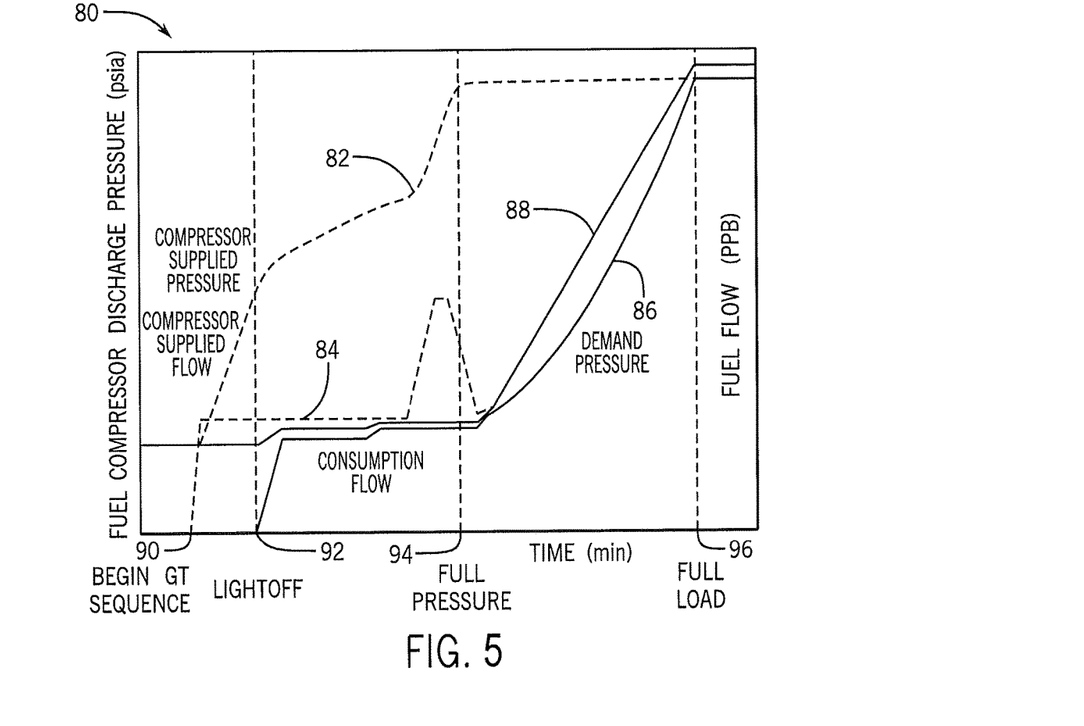
FIG. 5 is a graphical view of an embodiment of the startup of FIG. 4 showing fuel gas compressor supplied pressure, a compressor supplied flow, a consumption of flow, and a demand pressure of the gas turbine of FIG. 1.

FIG. 5 illustrates a graph 80 that depicts an embodiment of a startup of the gas turbine showing compressor supplied pressure 82, compressor supplied flow 84, demand pressure 86, and consumption flow 88 and the changes over time during a startup of the gas turbine 10. As illustrated, the compressor supplied pressure 82 and the compressor supplied flow 84 at fuel gas compressor 24 startup 90. Then, consumption of fuel begins at lightoff 92. In some embodiments, pressure builds until full pressure 94 is reached and the pressure supplied flow 84 rises with the consumption flow 88.

Figure 6:
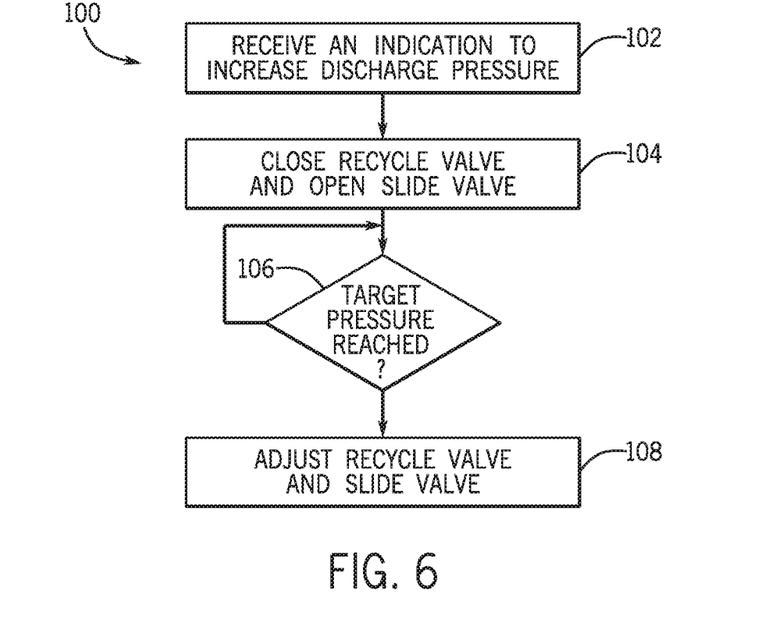
FIG. 6 is a flow-diagram view of an embodiment of a process for meeting an increased load demand of the gas turbine of FIG. 1.

FIG. 6 illustrates a process 100 for increasing load from a part load. The controller 36 receives an indication to increase discharge pressure (block 102). For instance, the indication may be a signal from a general controller for the gas turbine, received as an increased load demand, and/or an input from an operator indicating a request for more power from the gas turbine 10 via a human-machine interface. To increase discharge pressure, the controller 36 causes the recycle valve to at least partially close and/or opening a slide valve to increase displacement of the fuel gas compressor 24 (block 104). The controller 36 tracks the pressure reached and determines whether the target pressure has been reached (block 106). If the pressure has not been reached, the controller 24 the pressure continues to build either through continued operation or continuing to close the recycle valve and/or open the slide valve. Once the pressure has been reached, the controller 36 adjusts the recycle valve and/or the slide valve to reduce recycle discharge while enhancing fuel gas compressor 24 output (block 108).

Figure 7:
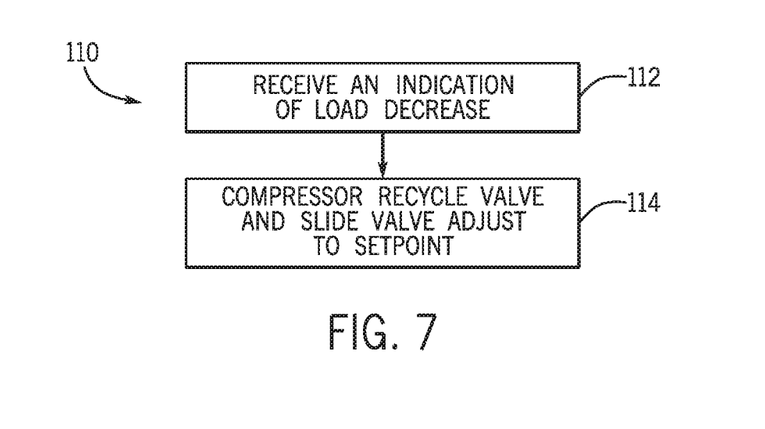
FIG. 7 is a flow-diagram view of an embodiment of a process for dealing with a decreased load demand of the gas turbine of FIG. 1.

FIG. 7 illustrates an embodiment of a process 110 for reducing load and discharge pressure. The controller 36 receives an indication that a load is to be decreased (block 112). For example, the load decrease indication may be received from any location similar to the load increase indication discussed previously. Furthermore, the load decrease may include a shutdown indication, a trip of the gas turbine 10, or a trip of the fuel gas compressor 24. Since reduced load corresponds to reduced flow and/or pressure requirements, the controller 36 reduces discharge pressure. To reduce compressor discharge pressure, the controller 36 causes the recycle valve to at least partially open and the slide valve to at least partially reduce capacity of the fuel gas compressor 24 (block 114). In some embodiments, the pressure is decreased using the recycle valve until a target pressure is reached at which point the slide valve used to return the recycle valve to a target setpoint once the system pressure is stabilized.

The written description includes various methods of operation for the gas turbine 10. As used herein these methods may be performed by the processor 38 and the memory 39 or any other portion of the gas turbine (e.g., a human-machine interface). Also, Although the foregoing, dynamic pressurization is primarily discussed in relation to fuel compressors in gas turbine systems, the dynamic pressure levels may be used to compress any fluid in the gas turbine by any compressor of the gas turbine system. Furthermore, dynamic pressurization may be applied to additional industrial machinery other than gas turbines using the foregoing techniques.

This written description uses examples to disclose concepts, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A gas turbine system, comprising:
   a combustor configured to burn a fuel and air mixture;
   a fuel gas compressor configured to compress fuel, wherein the fuel gas compressor is configured to generate a discharge pressure for the combustor based at least in part on a load demand for the gas turbine system, and the load demand is based at least in part on a load of the gas turbine system, and the load is a generator, and the fuel gas compressor comprises a screw compressor having a slide valve configured to control a displacement volume of the fuel gas compressor; and
   a controller configured to control the slide valve based at least in part on the load demand.

2. The gas turbine system of claim 1, wherein the fuel gas compressor discharge pressure has a minimum threshold that is independent of the load demand.

3. The gas turbine system of claim 2, wherein the minimum threshold that corresponds to a pressure differential across the fuel gas compressor that is sufficient to flow lubricant through the fuel gas compressor.

4. The gas turbine system of claim 3, wherein oil flows to screws of the fuel gas compressor, bearings of the fuel gas compressor, seals of the fuel gas compressor, a slide valve actuator of the fuel gas compressor, or a combination thereof.

5. The gas turbine system of claim 1, wherein the fuel gas compressor comprising:
   a suction port configured to pull in fuel gas for compression; and
   a recycle valve configured to return compressor discharge back to the suction port.

6. The gas turbine system of claim 5, wherein the recycle valve is configured to make relatively quick reductions to discharge pressure of the fuel gas compressor.

7. The gas turbine system of claim 6, wherein the slide valve is configured to adjust the displacement volume while the recycle valve is at least partially closed after the relatively quick reduction has been made.

8. The gas turbine system of claim 6, wherein the fuel and air mixture entering the gas turbine combustor comprises ambient air and gas fuel.

9. A gas turbine system comprising:
   a combustor configured to burn a fuel and air mixture;
   a fuel gas compressor configured to compress gas fuel, wherein the fuel gas compressor comprises a screw compressor having a slide valve; and
   a controller comprising:
      a processor configured to control the fuel gas compressor; and
      memory storing instructions that cause the processor to:

vary a discharge pressure from the fuel gas compressor by changing displacement volume of the fuel gas compressor using the slide valve based at least in part on load demand for the gas turbine system, wherein the load demand is based at least in part on a load of the gas turbine system and the load is a generator; and limit the discharge pressure to a value above a minimum threshold.

10. The gas turbine system of claim 9, wherein the minimum threshold corresponds to a pressure differential across the fuel gas compressor that is sufficient to flow lubricant through the fuel gas compressor.

11. The gas turbine system of claim 10, wherein the fuel gas compressor comprises:

a recycle valve configured to return compressor discharge back to a suction port of the screw compressor.

12. The gas turbine system of claim 11, wherein the instructions are configured to cause the processor to set the slide valve to an initial value at start up of the gas turbine system.

13. The gas turbine system of claim 12, wherein the initial value comprises a smallest displacement volume selectable via the slide valve.

14. The gas turbine system of claim 12, wherein the instructions are configured to cause the processor to:

determine whether the discharge pressure of the fuel gas compressor is above an adjustment threshold after startup has initiated; and when the discharge pressure has surpassed the adjustment threshold, increase fuel gas compressor displacement volume using the slide valve.

15. The gas turbine system of claim 14, wherein the instructions are configured to cause the processor to:

determine whether a setpoint for the discharge pressure has been reached by the fuel gas compressor, wherein the setpoint is at least partially based on the load demand on the gas turbine system; and when the setpoint has been reached, decrease displacement volume of the fuel gas compressor using the slide valve at least partially close the recycle valve.

16. A non-transitory, computer-readable memory storing instructions which when executed are configured to cause a processor to:

receive an indication of a load demand for a gas turbine system, wherein the load demand is based at least in part on a load of the gas turbine system and the load is a generator;

set a discharge pressure of a compressor of the gas turbine system based at least in part on the indication by changing displacement volume of the compressor using a slide valve of the compressor based at least in part on the load demand, wherein the compressor comprises a screw compressor; and limit the discharge pressure to a value above a pressure differential across the compressor that is sufficient to flow lubricant through the compressor.

17. The non-transitory, computer-readable medium of claim 16, wherein the instructions are configured to cause the processor to:

receive an indication that the discharge pressure is to be increased;

increase discharge pressure toward a target pressure by:

at least partially closing a recycle valve of the compressor to reduce an amount of compressor-discharged fuel from being returned from a suction port of the compressor; and at least partially opening the slide valve to increase displacement volume of the compressor.

18. The non-transitory, computer-readable medium of claim 17, wherein the instructions are configured to cause the processor to:

determine whether the discharge pressure has reached the target pressure; and level the discharge pressure near the target pressure by adjusting the recycle valve and slide valve.

19. The non-transitory, computer-readable medium of claim 17, wherein the target pressure is based at least in part on the indication of the load demand.

20. The non-transitory, computer-readable medium of claim 16, wherein the instructions are configured to cause the processor to:

receive an indication that the discharge pressure is to be decreased;

decrease discharge pressure toward a target pressure by:

at least partially opening a recycle valve of the compressor to increase an amount of compressor-discharged fuel being returned to a suction port of the compressor; and at least partially closing the slide valve to decrease displacement volume of the compressor.

* * * * *